A. REYNOLDS.
REVERSIBLE REGENERATIVE FURNACE.
APPLICATION FILED OCT. 18, 1912.

1,191,033.

Patented July 11, 1916.
9 SHEETS—SHEET 1.

A. REYNOLDS.
REVERSIBLE REGENERATIVE FURNACE.
APPLICATION FILED OCT. 18, 1912.

1,191,033.

Patented July 11, 1916.
9 SHEETS—SHEET 5.

Witnesses

Inventor
Alleyne Reynolds
by James L. Norris,
Attorney

A. REYNOLDS.
REVERSIBLE REGENERATIVE FURNACE.
APPLICATION FILED OCT. 18, 1912.

1,191,033.

Patented July 11, 1916.
9 SHEETS—SHEET 7.

UNITED STATES PATENT OFFICE.

ALLEYNE REYNOLDS, OF LONDON, ENGLAND.

REVERSIBLE REGENERATIVE FURNACE.

1,191,033. Specification of Letters Patent. Patented July 11, 1916.

Application filed October 18, 1912. Serial No. 726,528.

*To all whom it may concern:*

Be it known that I, ALLEYNE REYNOLDS, a subject of the King of Great Britain, residing in London, England, and whose post-office address is 117–119 Bank Chambers, Southampton Buildings, in the county of London, England, have invented certain new and useful Improvements in Reversible Regenerative Furnaces, of which the following is a specification.

The object of this invention is to overcome certain defects inherent in the ordinary Siemens reversible regenerative type of furnace and thereby render such furnaces capable of greater economy in working both as to fuel consumption and upkeep, and also make it possible to carry regeneration much further than usual, even to an extent involving the use of mechanical draft, and to apply such furnaces to novel purposes.

According to the present invention the combustion of the gas used for firing the furnace is effected in stages and the extent of the combustion accurately controlled in the several stages, combustion being initiated at two or more of the following points, namely (1) after the gas and air leave the regenerators on the inlet side and before they enter the furnace, (2) upon the gas and air entering the furnace, and (3) after the burnt and unburnt gases leave the furnace and prior to or upon their entering the usual regenerative chambers upon the outlet side of the furnace.

The air required for the complete combustion of the gas is supplied through a plurality of separate reversible air regenerative systems, and the relative quantities delivered at different points of the furnace system are regulated by valves placed in a cool part of the system, so that the extent of the combustion of the gases can be accurately controlled at the several stages.

For the purposes contemplated it is essential that the required air should be derived from separate air regenerative systems and also that the controlling valves should not be subjected to high temperatures, such as for example they would be subject to if exposed to direct radiation from the furnace, and these two essential features distinguish this invention from previous systems of heating furnaces of the Siemens type in which the burning of the combustible gases is effected in more than one stage.

As contemplated by the present invention there may be preliminary combustion within an inlet gas or air port or ports of the furnace by introducing into such port or ports a quantity of highly heated air or gas, as the case may be, so as to produce an initial or partial combustion in the said port or ports and thereby heat up the remainder of the unconsumed gas or air before its delivery to the furnace proper, or there may be a completion of combustion of the furnace gases within the outlet ports or regenerator chambers by the introduction thereto of a quantity of air, which should be at a comparatively low temperature so as not to give rise to unduly high temperatures within the regenerator structure.

To enable me to work the modified reversible regenerative furnace in the manner above indicated I subdivide either or both of the usual gas and air regenerative systems into two definite and unequal portions, the larger of which will be hereinafter referred to as the usual or main system, and the smaller as the auxiliary system. Each system is provided with a reversing valve and regulating valve arrangement of any suitable known type and also with dampers or valves whereby the relative amounts of waste gases passing through the various regenerator chambers can be controlled, such valves being placed in a cool part of the system and not constituting in any sense part of the furnace ports, so that they may remain effective for controlling accurately the proportions of air (or gas) admitted at the several points.

In the type of furnace illustrated in Figs. 1 to 7 the auxiliary air chambers are connected by flues with the gas ports of the furnace, and the auxiliary gas chambers (when such are employed) with the air ports of the furnace. By suitably regulating the auxiliary air and gas supplies the bulk of gas and air entering the furnace can, by a regulated amount of combustion within the inlet ports, be brought to as high a temperature as could be obtained through overheating the main regenerators, while radiation losses and cost of repairs are considerably reduced by confining the very high temperature to a comparatively small part of the furnace structure. In this arrangement, the combustion or working chamber 1 of the furnace is provided with the gas ports 2 and $2^a$ at opposite ends of the chamber, and air ports 3, $3^b$ and $3^a$, $3^c$, also arranged at opposite ends of the chamber. Auxiliary air ports 5, $5^b$ and $5^a$, $5^c$ lead, respectively, into the gas ports 2 and $2^a$ in such manner that the combustion may be caused to take place in the ports before the gas reaches the furnace chamber 1. Ducts 4 and $4^a$ connect the gas supply ducts 22, 20 and 21 (see Figs. 1, 2, 4 and 5) leading from suitable gas producers with the gas inlet ports 2 and $2^a$, respectively, a reversing valve 8 being provided at the junction 9 of the gas duct 22 with the ducts 4 and $4^a$ so as to direct the gas into one or the other of the ducts 4 or $4^a$ as desired. A regulating valve 10 is also provided to control the amount of gas passing from the duct 22 into either of the ducts 4 or $4^a$. Main air regenerator chambers 6, $6^b$ and $6^a$, $6^c$ are arranged conveniently with regard to the furnace (as shown, in Figs. 4 and 5 they are placed underneath the furnace working chamber 1), respectively, with the two sets of main air inlets 3, $3^b$ and $3^a$, $3^c$ (see Fig. 4). Auxiliary air regenerator chambers 7, $7^b$ and $7^a$, $7^c$ (clearly shown in Fig. 5 adjacent to the main air regenerator chambers) connect, respectively, with the auxiliary air ports 5, $5^b$ and $5^a$, $5^c$. The secondary main air regenerator chambers hereinafter called the main air recuperators 16, $16^b$ and $16^a$, $16^c$, through which the main air supply is fed, are arranged in front of said primary or main air regenerators and communicate with the corresponding primary sections by the ducts 11 and $11^a$, respectively, (Figs. 3, 5, 6 and 7). Secondary auxiliary air recuperators 17, $17^b$ and $17^a$, $17^c$ communicate in the same manner by the ducts 12 and $12^a$ with the primary auxiliary air recuperators 7, $7^b$ and $7^a$, $7^c$. Ports or passages 25 connect the recuperators 17 and $17^b$ and 16 and $16^b$, $16^a$ and $16^c$, $17^a$ and $17^c$ at their upper portions.

Figure 5:
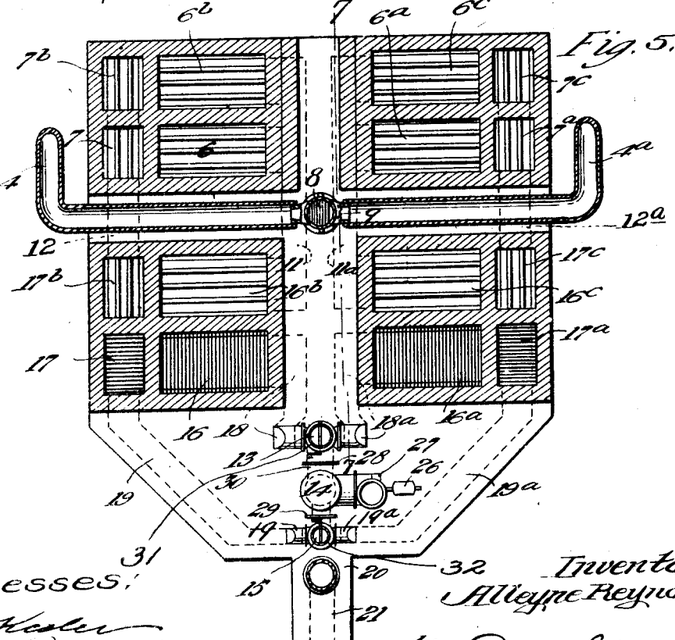
Fig. 5 is a horizontal sectional view of the entire apparatus taken substantially on line 5—5 of Fig. 4.
Figure 6:
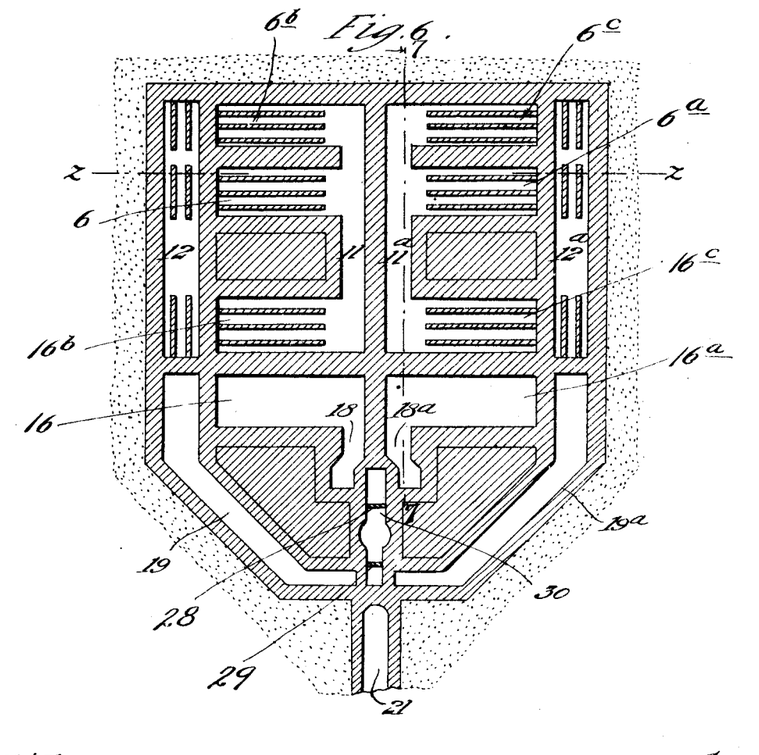
Fig. 6 is a horizontal sectional view taken on line 6—6 of Fig. 4 and illustrating the arrangement of the subterranean conduits or ducts for communicating the various chambers and reversing valves of the apparatus.
Figure 7:
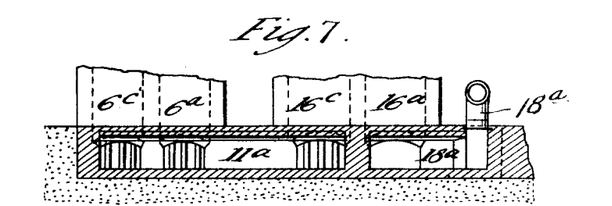
Fig. 7 is a fragmentary vertical sectional view taken substantially on line 7—7 of Figs. 5 and 6 and also illustrating the arrangement of the subterranean conduits.
Figure 13:
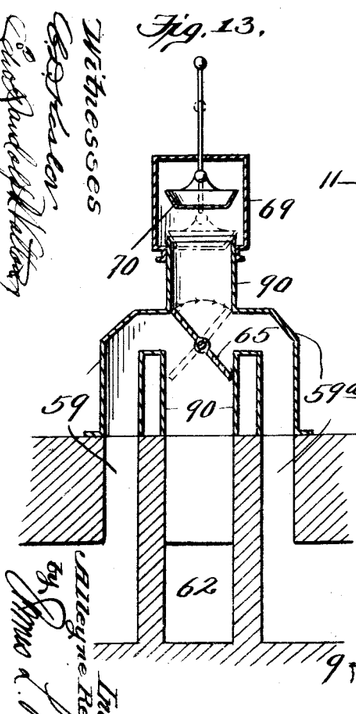
Fig. 13 is an enlarged detail sectional view taken on line 13—13 of Fig. 8 and illustrates the construction of the reversing valves referred to throughout the specification and the manner in which they control the passage of air and gas through the various ducts.

The ducts 18 and $18^a$, clearly shown in Figs. 5, 6 and 7, connect the recuperators 16 and $16^a$, respectively, with the main air supply duct 31, the in-take of which is controlled by the valve 24. The reversing valve 13 arranged in the duct 31 is disposed to control the direction of flow of fluid from the valve 24 through either of the ducts 18 and $18^a$, depending upon the position of said valve; and, also, from the latter ducts to the waste gas outlet chamber 14. The arrangement of the reversing valve 13 may be of any suitable construction so that when the air is entering on one side of the valve to one series of recuperators and regenerators, the hot air gases are exhausted from the other series of recuperators and regenerators on the other side of the valve; and, such reversing valves as hereinafter referred to, preferably comprise the construction and arrangement, relative to their associated ducts, as shown in Fig. 13 of the drawings.

Figure 1:
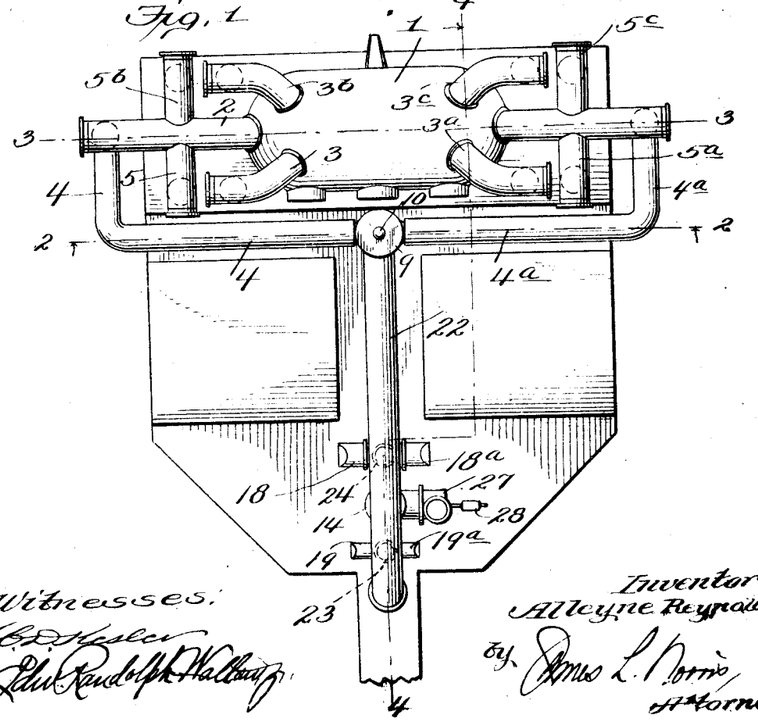
Figure 1 is a top plan view of the entire apparatus.
Figure 2:
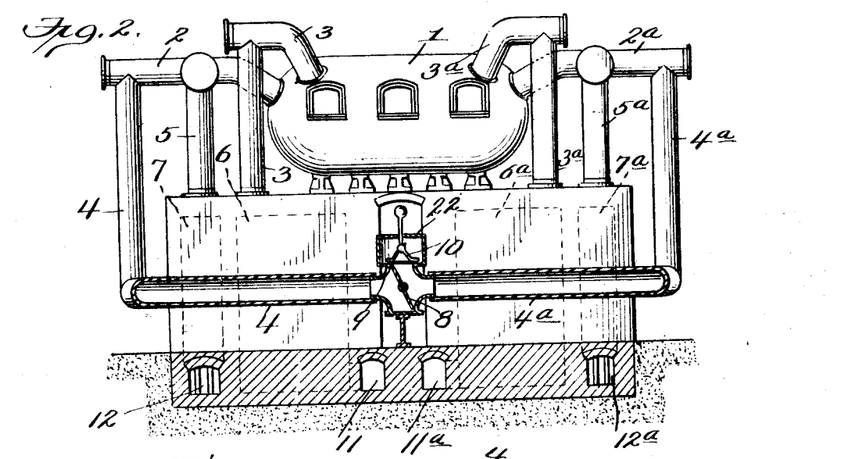
Fig. 2 is a vertical cross-section taken on line 2—2 of Fig. 1.
Figure 3:
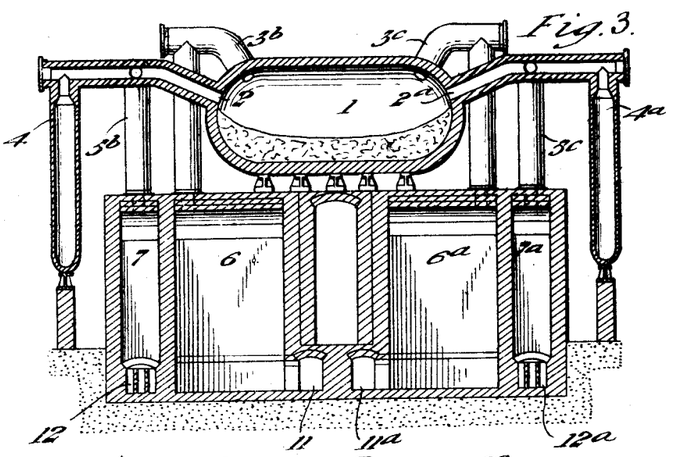
Fig. 3 is a vertical cross-section taken on line 3—3 of Fig. 1.
Figure 4:
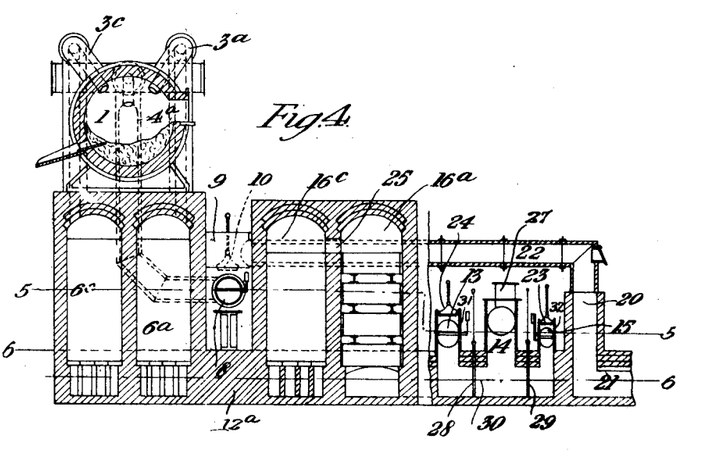
Fig. 4 is a longitudinal vertical sectional view of the entire apparatus taken on line 4—4 of Fig. 1.

The ducts 19 and $19^a$ (Figs. 5 and 6) connect the auxiliary air recuperators 17 and $17^a$ with the auxiliary air supply valve 23 controlling the air admission to the duct 32. The reversing valve 15, in this instance, likewise controls the direction of flow of fluid from the valve 23 through either one of the ducts 19 or $19^a$, and also from the latter to the waste gas outlet chamber 14, in a similar manner to that of the valve 13. The duct 30 connects the ducts 31 and 32 with the outlet chamber 14, as is clear from Fig. 4, and dampers 28 and 29 are provided therein for regulating the amount of waste gases passing from the ducts to said chamber. The motor 26 is provided to drive the fan 27 for exhausting the gas from the outlet chamber 14 (Figs. 1 and 4).

The course of the gases is as follows: When the furnace is, for the time being, worked, so that the flame travels from right to left in the working chamber gas from the producers passes along the ducts 21 and 20 through the tube 22 past the regulating valve 10 and according to the position of the reversing valve 8 shown in Figs. 2 and 5 through the tube 4ª to the gas port 2ª of the furnace. The main air supply passes the regulating valve 24 and enters the duct 31 and according to the position of the reversing valve 13 along the flue 18ª and upward through the cool recuperator chamber 16ª, the recuperators of which may be, and are shown as being cast iron plates. It then passes through ports 25 and down through the brickwork recuperators in chamber 16ᶜ into and through the flue 11ª, and thence upward through the main air regenerator chambers 6ª and 6ᶜ, and pipes or ducts 3ª and 3ᶜ into the chamber 1. Auxiliary air correspondingly passes the regulating valve 23 and enters the air duct 32, and according to the position of the reversing valve 15 moves through the flue 19ª, upward through cool chamber 17ª through the ports 25 down through chamber 17ᶜ along flue 12ª and up through chambers 7ª and 7ᶜ into flues 5ª and 5ᶜ and into gas port 2ª in such wise and such quantity that the partial combustion of the gas therein produces adequate temperature in the gases entering the furnace chamber 1. The amount of air passed through the air chambers to the gas port is so regulated that the gas entering the chamber 1 is at a sufficiently high temperature, and the amount of waste gases passing through the respective acting air regenerative and recuperator chambers into circulation and on the opposite side of the furnace from those delivering air to the chamber 1 is regulated by means of the dampers 28 and 29.

The waste gases from the working chamber 1 of the furnace will, in the present described circulation, pass through the gas and air ports 2, 3 and 3ᵇ, 5 and 5ᵇ into the air regenerator and recuperator chambers 6, 6ᵇ, 7, 7ᵇ, 16ᵇ, 17ᵇ, 16 and 17 to the ducts 18 and 19 which are in communication with the ducts 31 and 32, respectively. According to the position of the reversing valves 13 and 15 in the above described circulation, the waste gases will pass from the ducts 31 and 32 into the waste gas exhaust duct 30 and thence to the waste gas exhaust chamber 14 where it is exhausted to the atmosphere by the fan 27. It will be noted that in the present circulation the air being admitted to the furnace chamber 1 passes into the ducts 31 and 32 on one side of the reversing valves 13 and 15 and that the waste gases are directed to the exhaust chamber 14 by the other side of said valves.

In the modified type of furnace illustrated in Figs. 8 to 13 adapted to work with a reducing atmosphere in the furnace, an air reversing valve system of the three-way type and flue connections of a suitable nature are provided whereby cold or slightly heated air can be introduced into the main regenerators traversed by the waste gases so as to complete the combustion of the same without raising the temperature within the regenerators to too high a value. In this arrangement, the working or charge heating chamber 51 is provided with the gas ports 52 and 52ª at the opposite ends of the furnace connected by means of the ducts 54 and 54ª, respectively, with the gas regenerator chambers 56 and 56ª. Oppositely arranged air ports 53 and 53ª are also provided connected by the ducts 55 and 55ª, respectively, with the air regenerator chambers 57 and 57ª, respectively.

The ducts 59 and 59ª connect the air regenerator chambers 57 and 57ª, respectively, with the main air duct 90, air supply duct 69 and the waste gas exhaust duct 62. The air supplied from the duct 69 to the duct 90 is controlled by a suitably operated valve 71 and the direction of travel of the air from the duct 69 to either of the ducts 59 or 59ª is controlled by the position of the reversing valve 65, preferably of the butterfly type, as shown in Fig. 13. The reversing valve 65, also, directs the passage of the exhaust gases from either of the ducts 59 or 59ª to the duct 62 according to the position of the valve and the direction of circulation in the furnace.

Figure 11:
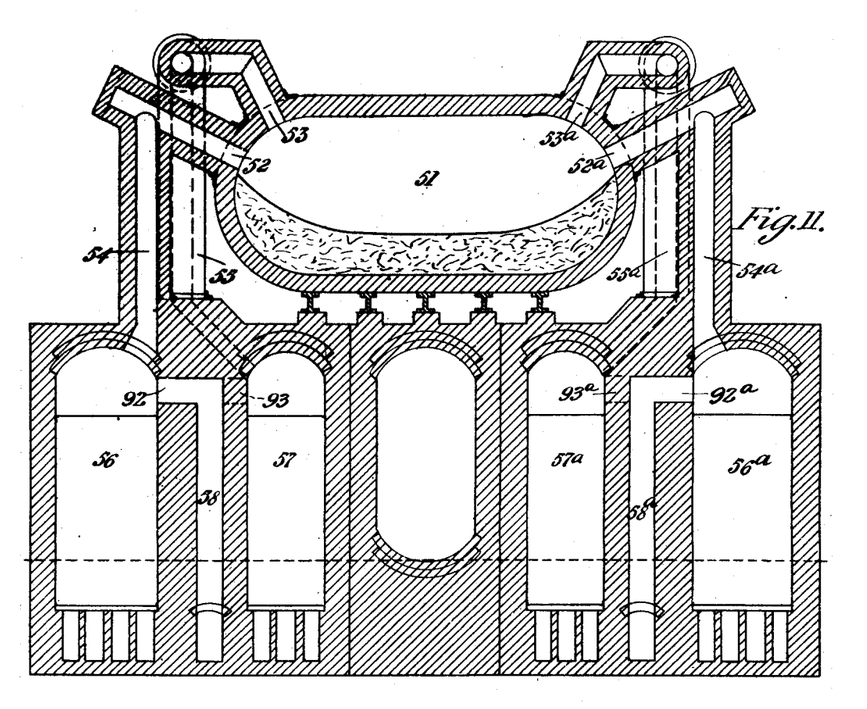
Fig. 11 is a vertical cross-section taken on line 11—11 of Fig. 8.

The ducts 60 and 61ª, which are the subterranean continuations of the air passages 58 and 58ª, respectively, clearly shown in Fig. 11, have connection with the duct 91 containing the reversing valve 66 and having connection with the air supply duct 69. The valve 66 directs the air from the duct 69 to either of the ducts 60 or 60ª, according to its position, the air supplied to the duct 91 from the duct 69 being controlled by a suitably operated valve 72. The air passages 58 and 58ª have communication with the chambers 56, 57 and 56ª and 57ª, respectively, through the ports 92, 93 and 92ª, 93ª, as shown in Fig. 11.

The ducts 68ᵇ and 68ᶜ connect the gas regenerator chambers 56 and 56ª, respectively, with the duct 94 having further connection with the duct 70 which, in turn, has a valve connection 73 with the gas supply duct 63. The lower end of the duct 94 opens into the waste gas exhaust duct 62 and contains a reversing valve 68 controlling the direction of travel of the gas supplied from the duct 63 to either of the ducts 68ᵇ and 68ª and the flow of the waste gases from either of the latter ducts to the waste gas exhaust duct 62. Between the fuel or gas supply duct 63 and the waste gas duct 62 is provided a by-pass 70ª provided with a cock, see Fig. 10, by means of which a small quantity of fuel gas may be led into and ignited in a small air flue 70ᵇ so that the leakage of gas through the valve 68 on reversal or otherwise may be ignited.

Figure 8:
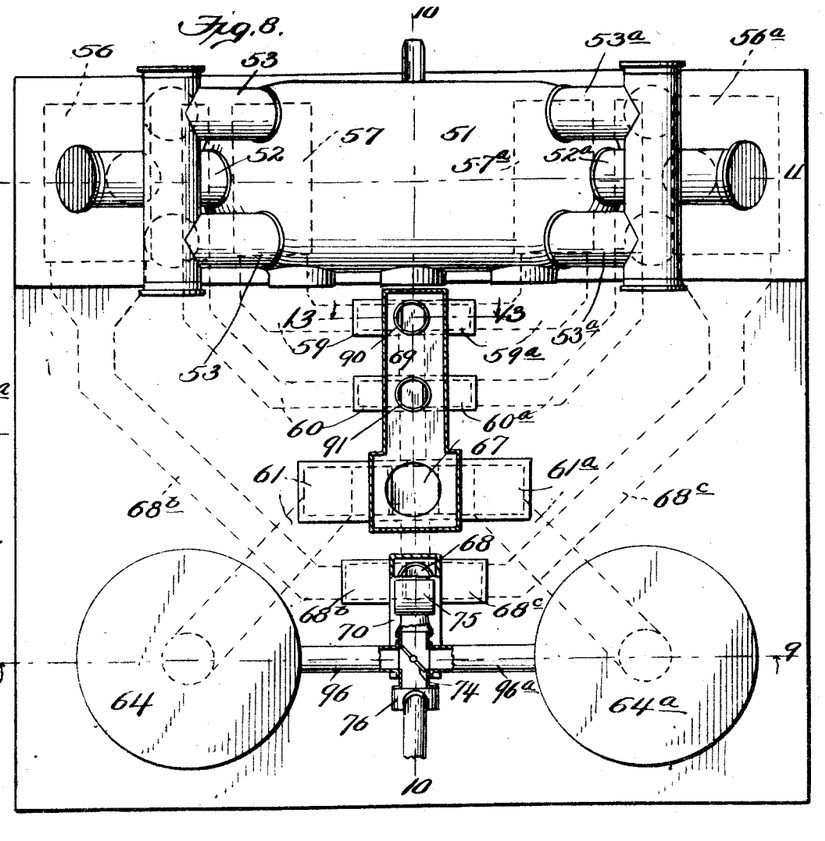
Fig. 8 is a plan view of a modified form of the invention, as shown in section, for a clear understanding thereof.
Figure 9:
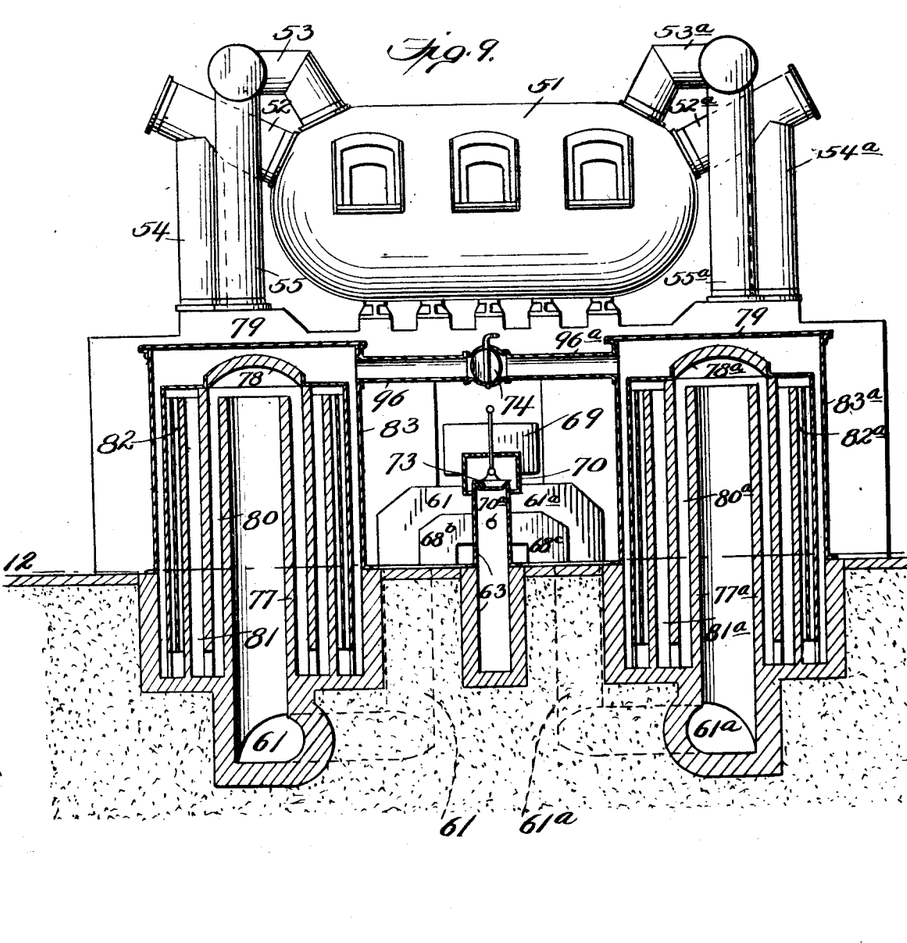
Fig. 9 is a front end sectional view taken substantially on line 9—9 of Fig. 8.
Figure 10:
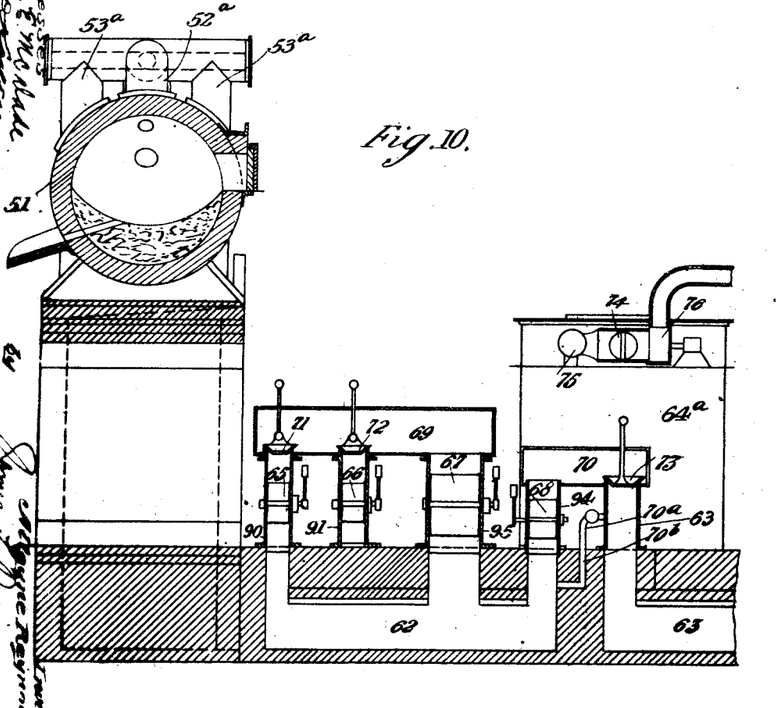
Fig. 10 is a longitudinal vertical sectional view of the entire modified form of the apparatus taken on line 10—10 of Fig. 8.

The secondary regenerators and recuperators 64 and 64ª are connected by ducts 61 and 61ª, respectively, with the hot air and waste gas reversing chamber 95 having the reversing valve 67 disposed therein (Figs. 8 and 9). The valve 67 is adapted to direct the flow of hot air from either of the recuperators 64 and 64ª, and the flow of waste gas from the waste gas duct 62 to either of said recuperators, according to the direction of circulation in the furnace and the position of said valve.

Figure 12:
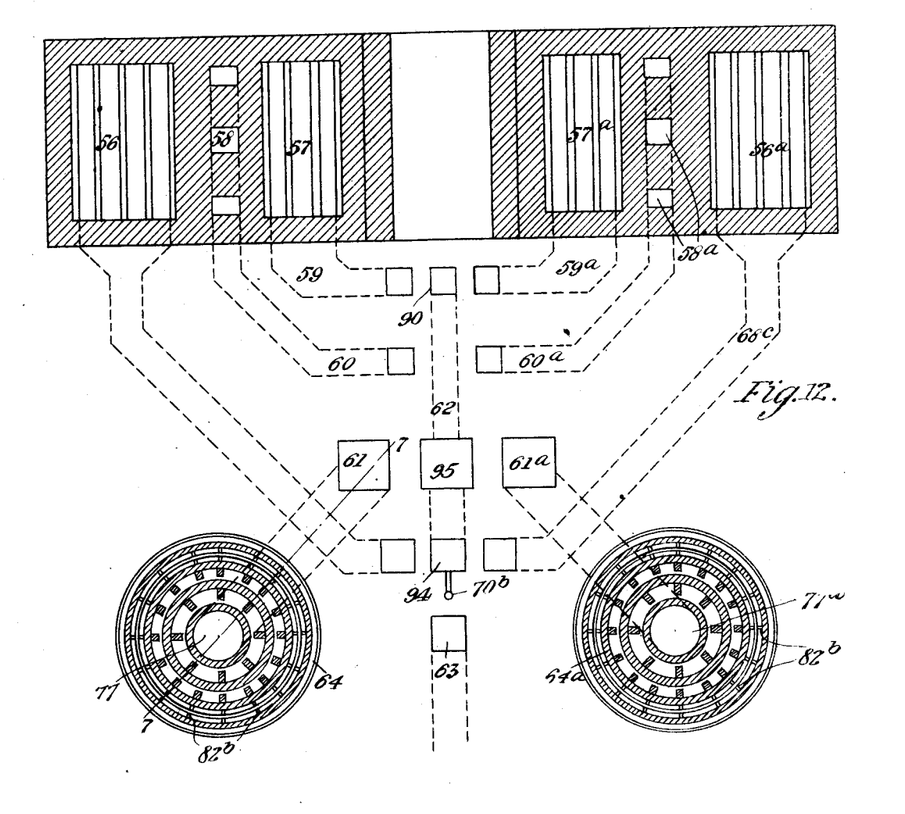
Fig. 12 is a horizontal sectional view taken substantially on line 12—12 of Fig. 9 and diagrammatically illustrates the relation and arrangement of the subterranean conduits relative to the various chambers of the apparatus.

The cold air enters one and the cold waste gases exhaust from the other of the recuperators 64 and 64ª by means of the reversing valve 74, a fan 75 being preferably provided to force the air through one of the recuperators and the suction fan 76 being provided to exhaust the waste gases from the other of said recuperators. The waste gases from the waste gas chamber 95 enter either of the ducts 61 or 61ª, according to the position of the valve 67, and flow to one of the recuperators where the gases pass upward through a brickwork flue 77, then under lid or cover 78 down the divided annular flue 80 and by means of openings at the bottom upward again through corresponding flues 81, and downward through corresponding flues 82 in which flanged or ribbed plates 82 of metal are placed (Fig. 12). The brickwork of the outer wall of flue 82 is metal cased, and by means of openings the waste gases finally issue between this metal casing and the outer casing 83 of the recuperator and pass upward to the duct 96, from which it is exhausted to the atmosphere by the suction fan 76. A lid 79 closes the metal casing of the recuperator.

The furnace is so worked that supposing the flame to be traveling from right to left in the furnace, as shown in the drawings, the following are the courses of the air, gas, and waste gases. Gas from flue 63 passes regulating valve 73, tube 70, reversing valve 68, flue 68ᶜ, regenerator chamber 56ª, flue 54ª, and enters the working chamber 51 by port 52ª where it is ignited. Air is forced through recuperator 64ª by the force fan 75, through duct 61ª, through reversing valve 67 into duct 69. A portion of this air passes regulating valve 71 and reversing valve 65 along duct 59ª, up through chamber 57ª, flues 55ª, to the air port 53ª, where it ignites the gas from port 52ª. Partially burnt waste gases pass through ports 52 and 53, and flues 54 and 55 into regenerator chambers 56 and 57 where they are supplied with the balance of the warmed air and their combustion is completed. This warmed air has taken the following course:—From duct 69 it has passed valve 72 and reversing valve 66 and through the duct 60 to the passage 58, leading into chambers 56 and 57, there meeting the products of partial combustion of the furnace, and completing same. The waste gases, (now those of complete combustion) pass along ducts 59 and 68ᵇ to the ducts 90 and 94, thence by the reversing valves 65 and 68, according to their positions, as indicated in Fig. 13, into the duct 62. From the duct 62 the waste gases pass upwardly into the chamber 95 and then by the reversing valve 67 which is so positioned as to direct the gases into the duct 61 to the recuperator 64 from which it is exhausted to the atmosphere by the suction fan 76. It is to be understood that by reversing the position of the valve 74 and the reversing valves 65, 66 and 68 correspondingly, the circulation of air through the furnace may be reversed.

Having thus described my said invention, I claim as new and desire to secure by Letters Patent:—

1. In a gas-fired reversible regenerative furnace, wherein combustion of the gas is effected in more than one stage, comprising, a working furnace chamber, a regenerator system for the air connected with the air ports opening into said chamber, regulating and reversing valves controlling the supply of air and gas to the air and gas ports and situated in a cool part of the furnace, a separate auxiliary reversible regenerator system for air communicating with the main air and gas regenerator system at points outside of said chamber, and regulating and reversing valves controlling the gases traversing the auxiliary regenerator system and situated in a cool part of the furnace, substantially as described.

2. A gas-fired reversible regenerative furnace wherein combustion of the gas is effected in more than one stage, comprising, a working furnace chamber, regenerator systems for air and gas connected with air and gas ports opening into said chamber, regulating and reversing valves controlling the supply of air and gas and situated in a cool part of the furnace, a separate auxiliary reversible regenerator system communicating with the main air and gas system at a point outside said chamber, and regulating and reversing valves controlling the gases traversing the auxiliary regenerator system and situated in a cool part of the furnace, substantially as described.

3. A gas-fired reversible regenerative furnace wherein combustion of the gas is effected in more than one stage, comprising, a working furnace chamber, regenerator systems for air and gas connected with air and gas ports opening into said chamber, regulating and reversing valves controlling the supply of air and gas and situated in a cool part of the furnace, a separate auxiliary reversible air regenerator system communicating with the main gas system at a point outside said chamber, and regulating and reversing valves controlling the said auxiliary air regenerator system, substantially as described.

4. A gas-fired reversible regenerative furnace wherein combustion of the gas is effected in more than one stage, comprising, a working furnace chamber, regenerator systems for air and gas connected with air and gas ports opening into said chamber, regulating and reversing valves controlling the supply of air and gas and situated in a cool part of the furnace, a separate auxiliary reversible air regenerator system communicating with the gas ports leading from the main gas regenerator system to said chamber, and regulating and reversing valves controlling the said auxiliary air regenerator system, substantially as described.

5. A gas-fired reversible regenerative furnace wherein combustion of the gas is effected in more than one stage, comprising a working furnace chamber, regenerator systems for air and gas connected with the air and gas ports opening into said chamber, regulating and reversing valves controlling the supply of air and gas and situated in a cool part of the furnace, said generator systems comprising a plurality of sets of spaced air and gas chambers and a duct between the air and gas chambers of each set, said duct communicating with the air and gas chambers whereby comparatively cool air may, without substantially raising the temperature, be diverted into the air and gas generator systems at a point at which hot gas enters the latter, and reversing valves situated in a cool part of the furnace for controlling the passage of fluid through the ducts.

In testimony whereof I have signed my name to this specification in the presence of two subscribing witnesses.

ALLEYNE REYNOLDS.

Witnesses:
L. B. BROOKING,
LUTHER J. PARR.